Dec. 16, 1969   H. GOPSTEIN   3,483,989
CHLORINE DISPENSING DEVICE
Filed Sept. 13, 1967
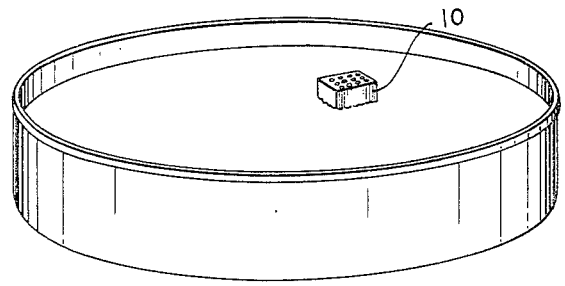
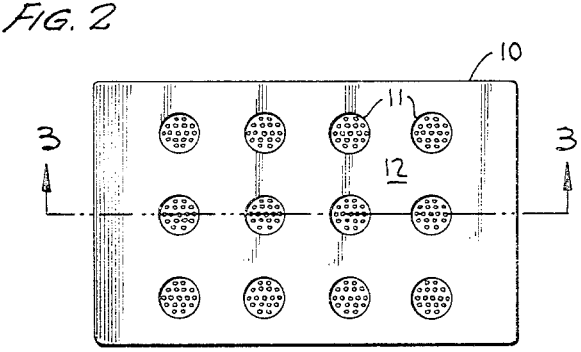
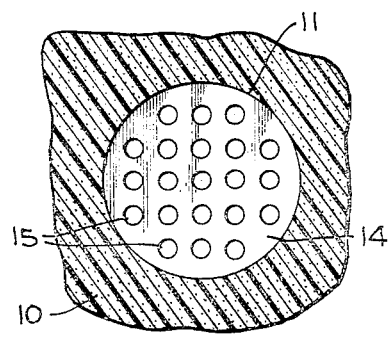
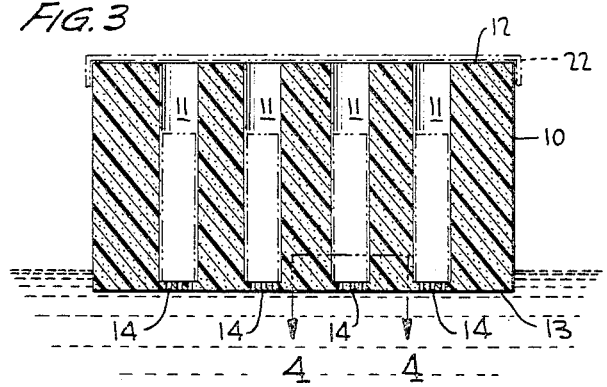
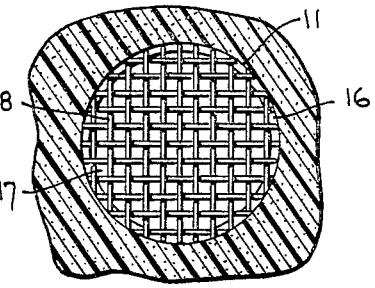
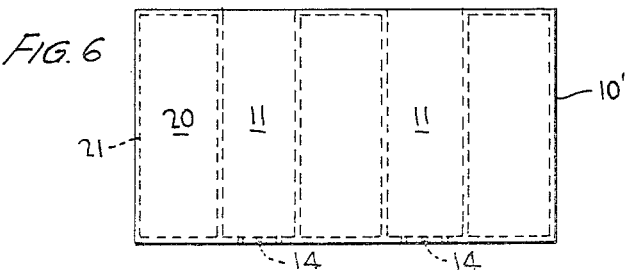
INVENTOR,
HERBERT GOPSTEIN

United States Patent Office 3,483,989
Patented Dec. 16, 1969

3,483,989
CHLORINE DISPENSING DEVICE
Herbert Gopstein, 2611 Newell Drive, Faulkland
Heights, Wilmington, Del. 19808
Filed Sept. 13, 1967, Ser. No. 667,510
Int. Cl. C02b 1/18, 3/06; A23f 3/02
U.S. Cl. 210—242     8 Claims

ABSTRACT OF THE DISCLOSURE

An easily manufactured and operated device for dispensing chlorine at a controlled rate into a home swimming pool is provided. An exceedingly buoyant block is pierced with a number of holes running from its top face to its bottom face. The holes are of sufficient diameter to accommodate a stack of commercial "chlorine" pills used for bacteria control in swimming pools. The bottoms of the holes are stoppered with liquid-pervious means to permit the water to come up into the holes and slowly dissolve the lowest layer of pills.

Background of the invention

This invention relates to a device for dispensing chlorine to a home swimming pool at a controlled rate. It is a sanitary requirement in the use of swimming pools that the condition of the water be periodically tested and that chlorine be added in the required amount to prevent the undue rise of bacteria count of the water. Various types of testing equipment are available whereby a person without any particular skill or training in chemistry, by following simple directions, can test the water of a swimming pool and determine the amount of chlorine to be added. "Chlorine" pills, which actually contain one or more solid chlorine-releasing compounds, are added to the water in the amount prescribed by the test results. The water is then safe for swimming for a specified period, after which the procedure must be repeated. Depending on circumstances it is sometimes desirable to dissolve the prescribed amount of chlorine over a relatively long period, as for instance several hours. On other occasions, however, it may be more desirable to dissolve the chloine as rapidly as possible.

A problem exists in how best to dissolve the chlorine in the swimming pool water. Chlorine is a corrosive chemical and also a bleach. Although the chlorine pills can simply be thrown into the water, it is not desirable to place them where they might be stepped on by swimmers before they are dissolved. Also, in the very popular "above-ground" swimming pools, the sides and bottom of which are generally lined with a vinyl liner, a problem may arise due to the chlorine attacking the vinyl liner adjacent to the pills if they are simply thrown into the pool. It would appear to be convenient in the case of swimming pools equipped with filtration equipment to add the chlorine at this point inasmuch as circulating water is constantly passing through this equipment, but most manufacturers recommend that the chlorine not be added at this point lest it corrode the equipment.

It is an object of this invention to provide means whereby chlorine pills can be placed in a swimming pool for gradual dissolution without any chance for damage to the swimming pool and associated equipment and without any chance for injury or inconvenience to swimmers.

It is another object of this invention to provide means for dissolving the prescribed number of chlorine pills in a swimming pool at either a slow or a fast rate at the election of the user of the means.

It is a further object of this invention to provide such means for the dispensing of chlorine into swimming pools which are exceedingly simple to manufacture and easy to use by one having no special skill and which means have no moving parts and therefore are not subject to breakdown.

The manner in which these and other objects of the instant invention are achieved will be apparent to one with ordinary skill in this art from a consideration of this specification and accompanying drawing.

Summary of the invention

The objects of this invention are achieved by deploying the chlorine pills for dissolution in the swimming pool in holes in a higly buoyant block. It is essential to the achievement of the objectives of the invention that the block be so buoyant that the great preponderance of its thickness dimension be above the water line when it floats in the water loaded with chlorine pills. Holes penetrate this block from the top face thereof almost to the bottom face. Liquid pervious stoppering means at the bottom of each hole permits water to rise to its equilibrium level within each hole while retaining the chlorine pills in the holes in which they are placed.

As this block floats on the water, water seeks its own level within the holes and slowly dissolves those pills which it reaches, i.e. the lowest pills in each stack. The rate of chlorine addition is controlled by the manner in which the pills are distributed in the holes. Thus, if the requisite number of pills are placed in a single stack in just one of the holes it will take several hours for them all to dissolve. On the other hand, if the same number of pills are distributed through a number of the holes, water will simultaneously be reaching a greater number of pills and dissolving them so that the entire charge of pills will be more quickly dissolved in the water.

Brief description of the drawing

In the accompanying drawing

FIGURE 1 is a pictorial representation of an above-the-ground home swimming pool with the means of the invention in use;

FIGURE 2 is a plan view of one embodiment of the means of the instant invention;

FIGURE 3 is a cross-sectional of the same means of the instant invention taken along line 3—3 in FIGURE 2;

FIGURE 4 is a sectional view of the liquid-pervious means at the bottom of a chamber of the means of the instant invention taken as indicated by section line 4—4 in FIGURE 3;

FIGURE 5 is an alternative embodiment of the liquid-pervious means of such a hole; and FIGURE 6 is a schematic representation of an alternative embodiment of the invention.

Description of a preferred embodiment of the instant invention

The embodiment shown in FIGURES 2–4 of the drawing may be made from a block of highly buoyant material such as an expanded polymeric material, for instance styrene. One such material is sold under the trademark "Styrofoam." A block of this material of any convenient size, as for instance 10 inches long by 6 inches wide and 4 inches thick, serves well for the purposes of this invention.

As may best be seen in FIGURES 2 and 3, the block 10 has plurality of holes 11 drilled downward from its top face 12 toward but not quite to the bottom face 13. These holes may be of any convenient shape, as for instance a cylindrical shape with a diameter of ¾ of an inch, which is just in excess of the diameter of commonly used commercial chlorine pills. The bottom surfaces 14 of each of these holes communicates with the bottom face of the block by liquid-pervious means. A liquidtight cover 22 may be placed over the block to prevent water from being splashed into the tops of the holes 11.

One form of such liquid-pervious means is shown in FIGURE 4 where a plurality of small apertures 15, each considerably smaller in diameter than the hole 11, communicate between the lower surface 14 of the hole 11 and the lower surface 13 of the block.

Alternative liquid-pervious stoppering means are shown in FIGURE 5. In this embodiment at the bottom of hole 11 there is a small circumferential step 16 surrounding reduced opening 17 which communicates between hole 11 and bottom surface 13. A screen 18 is laid on step 16 to act as a support for the chlorine pills to be placed in hole 11. The screen may be of any material not corroded by chlorine, as for instance a polymeric material such as polypropylene, nylon, styrene or the like.

An alternative embodiment of the invention is shown schematically in FIGURE 6. The block 10' has a plurality of buoyancy chambers 20 between the holes 11. As in the previously described embodiment, liquid-pervious stoppering means communicate between the bottom surfaces 14 of the holes and the bottom surface of the block 10'. Buoyancy chambers 20 may consist of a volume of air entrapped by membrane 21. The advantage of this embodiment is that a more dense, and therefore more sturdy construction material may be used for the block.

The use of the instant invention may best be described with reference to FIGURE 3. Let it be assumed that a test of the swimming pool water in which the invention is to be employed indicates that 8 tablets of chlorine should be added and let it be further assumed that it is desired that these tablets dissolve over a period of 4 hours, the anticpiated period of use of the pool. The rate of dissolution of any particular brand of chlorine pills under any given particular conditions of use can be readily determined by simply timing it. A good average figure for most commonly available brands of pills under average conditions of home swimming pool use is approximately ½ hour. Therefore, if the 8 pills are stacked in one hole of the block 10, as shown in FIGURE 3, it will take about 4 hours for these pills to dissolve.

On the other hand if it is desired to add these 8 pills to the water as rapidly as possible, they may be distributed one to a hole in the block 10 and the entire chlorine addition will be completed within about a half hour.

Use of a block 10 of sufficiently high buoyancy is the key to the invention. This may be achieved by fashioning the block out of a low density foam material or by incorporating buoyancy chambers in a block fashioned of denser material. It is desirable that the block, when fully loaded with the chlorine pills to be dispensed, floats so high in the water that only the lower level of pills in each hole is in contact with water.

Variations, modifications and other embodiments of my invention will be obvious to those skilled in this art from a consideration of this specification and drawing and are intended to be embraced by the scope of the claims hereof.

I claim:

1. Means for dissolving chlorine-releasing solids in swimming pools comprising a highly buoyant block with a plurality of holes extending from one face thereof to within a short distance of the opposite face thereof and liquid-pervious means communicating between the bottoms of said holes and said opposite surface.

2. The means of claim 1 wherein said liquid-pervious means comprise a plurality of apertures substantially smaller in diameter than said holes.

3. The means of claim 1 wherein said liquid-pervious means comprise a screen.

4. The means of claim 1 wherein said holes are substantially cylindrical holes.

5. The means of claim 4 wherein said holes have a diameter of substantially ¾ inch.

6. The means of claim 1 wherein said block is sufficiently buoyant whereby, when said block is filled with chlorine pills, it floats sufficiently high in the water that only the lower level of pills in each hole is in contact with water.

7. The means of claim 1 wherein said block is fashioned of low-density foam material.

8. The means of claim 1 wherein said block contains a plurality of buoyancy chambers.

References Cited

UNITED STATES PATENTS

| 2,519,825 | 8/1950 | De Ment | 9—8 X |
| 2,934,409 | 4/1960 | Biehl | 23—267.1 |
| 3,107,156 | 10/1963 | Frederick | 23—267.1 |

ROBERT B. REEVES, Primary Examiner

N. L. STACK, Jr., Assistant Examiner

U.S. Cl. X.R.

206—0.5; 23—267